(12) United States Patent
Yamaguchi et al.

(10) Patent No.: US 11,301,092 B2
(45) Date of Patent: Apr. 12, 2022

(54) DISPLAY DEVICE WITH ELECTROSTATIC CAPACITIVE TOUCH PANEL

(71) Applicant: SEIKO EPSON CORPORATION, Tokyo (JP)

(72) Inventors: Yoshiyuki Yamaguchi, Nagano (JP); Toru Matsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/033,999

(22) Filed: Sep. 28, 2020

(65) Prior Publication Data
US 2021/0096671 A1 Apr. 1, 2021

(30) Foreign Application Priority Data
Sep. 30, 2019 (JP) .............................. JP2019-179377

(51) Int. Cl.
*G06F 3/044* (2006.01)
(52) U.S. Cl.
CPC .................................... *G06F 3/044* (2013.01)
(58) Field of Classification Search
CPC ......... G06F 3/044; G06F 1/184; G06F 3/0412
See application file for complete search history.

(56) References Cited

U.S. PATENT DOCUMENTS

| | | | | |
|---|---|---|---|---|
| 2005/0012723 | A1* | 1/2005 | Pallakoff | G06F 1/1618 |
| | | | | 345/173 |
| 2009/0262095 | A1 | 10/2009 | Kinoshita et al. | |
| 2011/0193817 | A1* | 8/2011 | Byun | G06F 3/045 |
| | | | | 345/174 |
| 2012/0249458 | A1* | 10/2012 | Okazaki | G06F 3/047 |
| | | | | 345/173 |
| 2012/0287066 | A1* | 11/2012 | Yang | G06F 1/1643 |
| | | | | 345/173 |
| 2016/0062526 | A1* | 3/2016 | Delmaere | G06F 3/0412 |
| | | | | 345/173 |
| 2017/0090673 | A1* | 3/2017 | Kim | G06F 3/044 |
| 2017/0171962 | A1* | 6/2017 | Byun | G02B 6/0083 |
| 2018/0151144 | A1* | 5/2018 | Kawashima | G06F 3/0418 |
| 2019/0220115 | A1* | 7/2019 | Mori | G06F 3/04186 |
| 2019/0361558 | A1* | 11/2019 | Ko | G06F 3/047 |
| 2020/0042131 | A1* | 2/2020 | Lee | G06F 3/0414 |
| 2020/0089354 | A1* | 3/2020 | Gray | G06F 3/0412 |
| 2020/0196452 | A1* | 6/2020 | Lee | G06F 3/04164 |

FOREIGN PATENT DOCUMENTS

JP 2009-258935 A 11/2009

* cited by examiner

*Primary Examiner* — Hong Zhou
(74) *Attorney, Agent, or Firm* — Global IP Counselors, LLP

(57) ABSTRACT

Provided is a display device with an electrostatic capacitive touch panel including a display panel that displays an image, an electrostatic capacitive touch panel that detects a presence/absence of a contact, a circuit substrate that is provided with a control circuit controlling the display panel and the electrostatic capacitive touch panel, a metal frame that has a first opening portion and is provided between the display panel and the control substrate, a first flexible substrate that passes through the first opening portion and couples the display panel and the control substrate to each other, and a second flexible substrate that is provided with a semiconductor element receiving a signal output from the electrostatic capacitive touch panel and couples the electrostatic capacitive touch panel and the control substrate to each other without passing through the first opening portion.

15 Claims, 11 Drawing Sheets

DISPLAY DEVICE WITH ELECTROSTATIC CAPACITIVE TOUCH PANEL

The present application is based on, and claims priority from JP Application Serial Number 2019-179377, filed Sep. 30, 2019, the disclosure of which is hereby incorporated by reference here in its entirety.

BACKGROUND

1. Technical Field

The present disclosure relates to a display device with an electrostatic capacitive touch panel.

2. Related Art

In the related art, a display device with an electrostatic capacitive touch panel has been proposed. In general, the display device with the electrostatic capacitive touch panel has a display panel that displays an image, an electrostatic capacitive touch panel that detects a contact, a circuit substrate provided with a control circuit that controls the display panel and the electrostatic capacitive touch panel, a flexible substrate for a display panel that couples the display panel and the circuit substrate to each other, and a flexible substrate for a touch panel that couples the electrostatic capacitive touch panel and the circuit substrate to each other (for example, see JP-A-2009-258935).

In the display device with the electrostatic capacitive touch panel in the related art, when viewed from a direction perpendicular to the display panel, the flexible substrate for a display panel and the flexible substrate for a touch panel overlap each other. Therefore, a signal transmitted from the flexible substrate for a display panel is superimposed on a signal transmitted from the flexible substrate for a touch panel as noise, and there is a problem in that a detection result of contact by an electrostatic capacitive touch panel cannot be accurately grasped.

SUMMARY

According to an aspect of the present disclosure, to solve the above problems, there is provided a display device with an electrostatic capacitive touch panel including: a display panel that displays an image; an electrostatic capacitive touch panel that detects a presence/absence of a contact; a circuit substrate that is provided with a control circuit controlling the display panel and the electrostatic capacitive touch panel; a metal frame that has a first opening portion and is provided between the display panel and the circuit substrate; a first flexible substrate that passes through the first opening portion and couples the display panel and the circuit substrate to each other; and a second flexible substrate that is provided with a semiconductor element receiving a signal output from the electrostatic capacitive touch panel and couples the electrostatic capacitive touch panel and the circuit substrate to each other without passing through the first opening portion.

DESCRIPTION OF EXEMPLARY EMBODIMENTS

Hereinafter, an embodiment for carrying out the present disclosure will be described with reference to the drawings. However, in each drawing, the size and scale of each part are appropriately different from the actual ones. Further, the embodiment described below is a desired specific example of the present disclosure, so various technically desirable limitations are attached, but the scope of the present disclosure is not limited to these forms unless otherwise specified in the following description.

A. Embodiment

In the present embodiment, a display device with an electrostatic capacitive touch panel will be described by exemplifying a tablet terminal 1.

1. Overview of Tablet Terminal

Hereinafter, the overview of the tablet terminal 1 according to the present embodiment will be described with reference to FIGS. 1 to 3.

Figure 1:
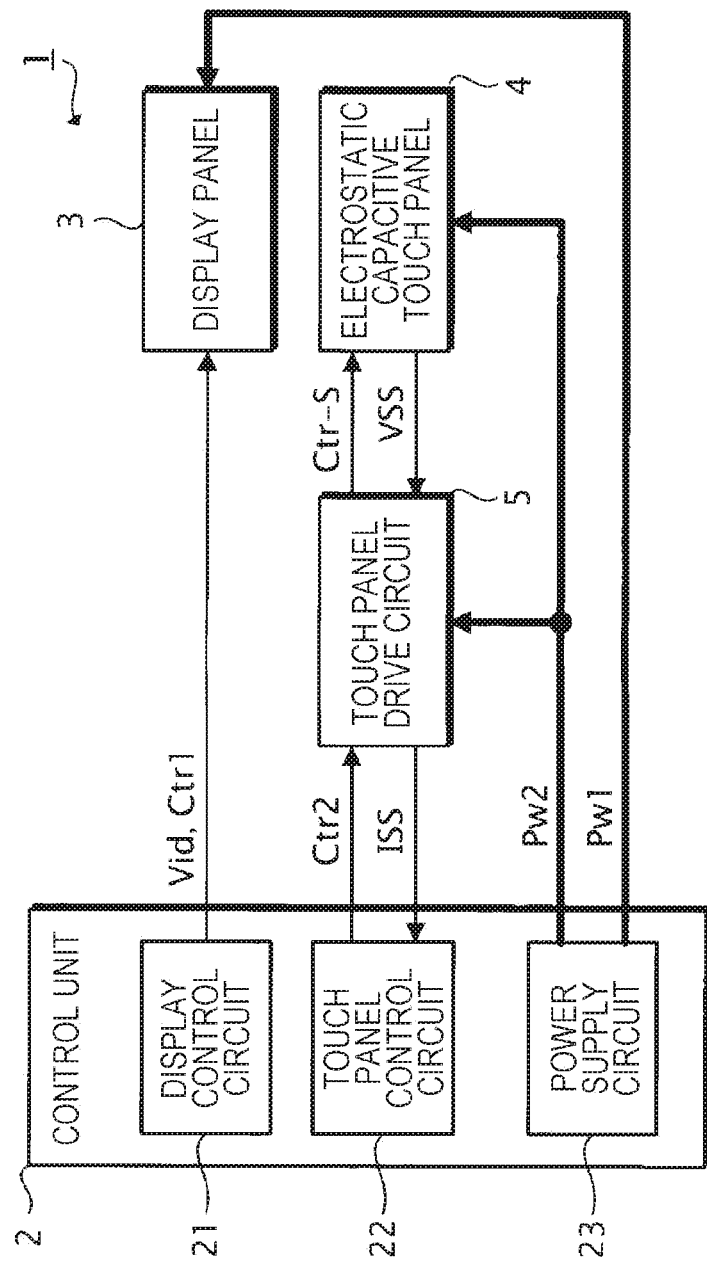
FIG. 1 is a block diagram illustrating an example of a configuration of a tablet terminal according to an embodiment of the present disclosure.

FIG. 1 is a functional block diagram illustrating an example of a functional configuration of the tablet terminal 1.

As illustrated in FIG. 1, the tablet terminal 1 includes a control unit 2, a display panel 3, an electrostatic capacitive touch panel 4, and a touch panel drive circuit 5.

The control unit 2 includes a display control circuit 21 that controls the display panel 3, a touch panel control circuit 22 that controls the electrostatic capacitive touch panel 4, and a power supply circuit 23 that supplies electric power to the display panel 3, the electrostatic capacitive touch panel 4, and the touch panel drive circuit 5. In the following, the display control circuit 21 and the touch panel control circuit 22 may be referred to as "a control circuit".

By supplying a control signal Ctr1 that defines an operation of the display panel 3 and an image signal Vid that indicates an image to be displayed on the display panel 3 to the display panel 3, the display control circuit 21 controls the display panel 3 so that the display panel 3 displays the image indicated by the image signal Vid. In the present embodiment, as an example, it is assumed that the image signal Vid is an analog signal. By supplying a control signal Ctr2 that defines an operation of the touch panel drive circuit 5 to the touch panel drive circuit 5 that drives the electrostatic capacitive touch panel 4, the touch panel control circuit 22 controls the electrostatic capacitive touch panel 4 via the touch panel drive circuit 5. The touch panel drive circuit 5 generates a control signal Ctr-S for controlling a drive of the electrostatic capacitive touch panel 4 based on the control signal Ctr2, and supplies the generated control signal Ctr-S to the electrostatic capacitive touch panel 4. When the electrostatic capacitive touch panel 4 is driven by the control signal Ctr-S, the electrostatic capacitive touch panel 4 detects a contact of an object such as a finger or a pen on the electrostatic capacitive touch panel 4 and outputs a detection signal VSS indicating the detection result. The touch panel drive circuit 5 generates a contact position signal ISS indicating a contact position of the object with respect to the electrostatic capacitive touch panel 4 based on the detection signal VSS, and outputs the generated contact position signal ISS to the touch panel control circuit 22.

The power supply circuit 23 supplies a drive voltage Pw1 for driving the display panel 3 to the display panel 3, and supplies a drive voltage Pw2 for driving the electrostatic capacitive touch panel 4 and the touch panel drive circuit 5 to the electrostatic capacitive touch panel 4 and the touch panel drive circuit 5. In the present embodiment, the drive voltage Pw1 is higher than the drive voltage Pw2.

Figure 2:
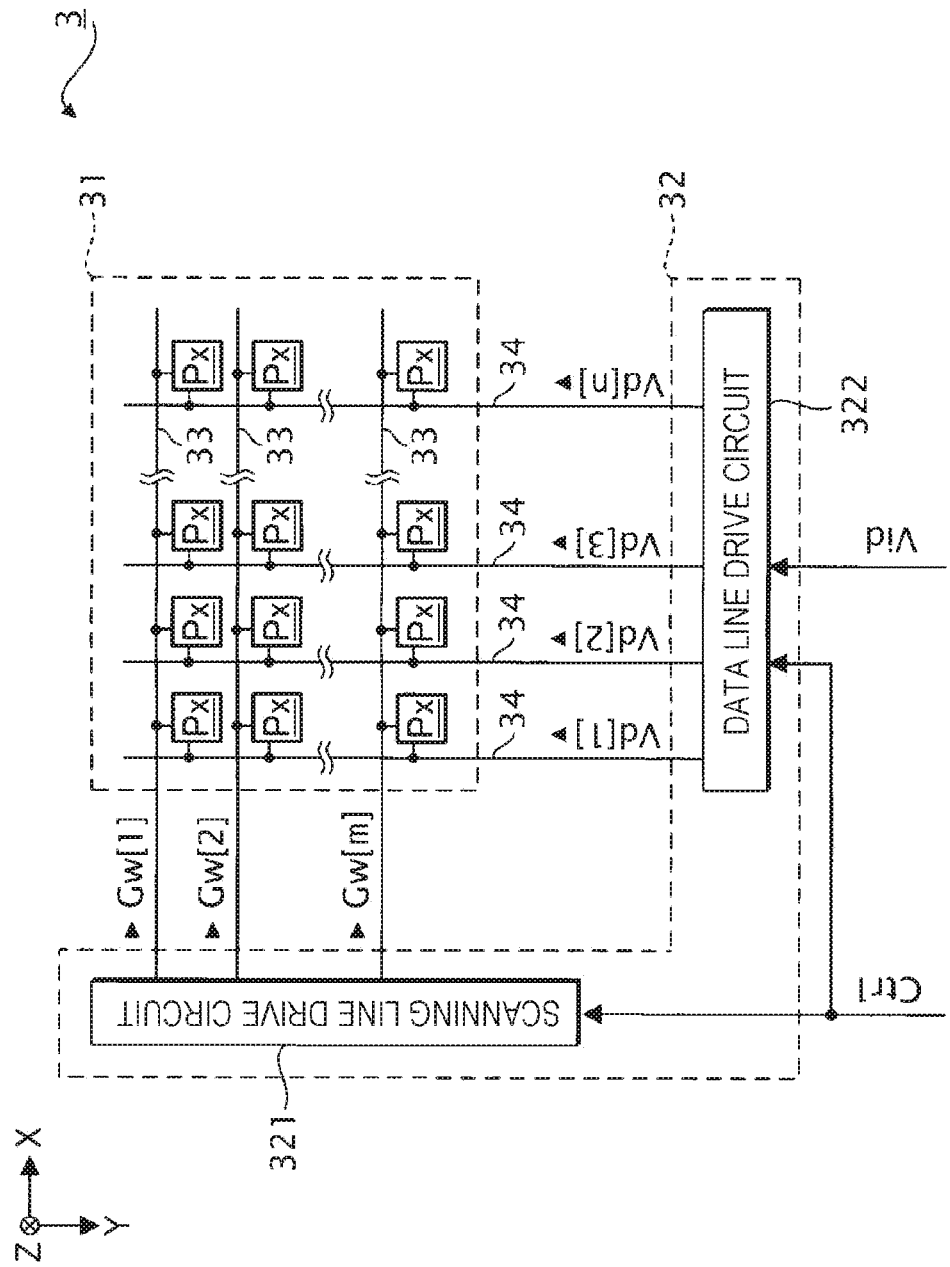
FIG. 2 is a block diagram illustrating an example of a configuration of a display panel.

FIG. 2 is a block diagram illustrating an example of a configuration of the display panel 3.

As illustrated in FIG. 2, the display panel 3 includes a display portion 31 provided with a plurality of pixels Px, and a drive circuit 32 that drives the display portion 31.

The display portion 31 includes M rows of scanning lines 33 that extend in the +X direction, N columns of data lines 34 that extend in the +Y direction, and (M×N) pixels Px that correspond to (M×N) intersections between the M rows of scanning lines 33 and N columns of data lines 34 and that are arranged in a matrix of N columns in the +X direction and M rows in the +Y direction.

In the present embodiment, as an example, it is assumed that the value M is a natural number that satisfies M≥270 and the value N is a natural number that satisfies N≥480. Further, in the present embodiment, as an example, it is assumed that the display portion 31 has a size of 4.3 inches or more. However, the present disclosure is not limited to such an aspect, and the value M may be at least a natural number that satisfies M≥200, and the value N may be at least a natural number that satisfies N≥300. The display portion 31 may have a size of at least 4 inches or more.

The +Y direction is a direction intersecting the +X direction. Hereinafter, the direction orthogonal to the +X direction and the +Y direction is referred to as the +Z direction. Further, hereinafter, the opposite direction of the +X direction is referred to as the −X direction, the opposite direction of the +Y direction is referred to as the −Y direction, and the opposite direction of the +Z direction is referred to as the −Z direction. In the following, the +X direction and the −X direction may be collectively referred to as the X axis direction, the +Y direction and the −Y direction may be collectively referred to as the Y axis direction, and the +Z direction and the −Z direction may be collectively referred to as the Z axis direction. In the present embodiment, the case where the X axis direction and the Y axis direction are orthogonal to each other is assumed as an example.

The drive circuit 32 includes a scanning line drive circuit 321 and a data line drive circuit 322.

The scanning line drive circuit 321 generates a selection signal Gw[m] for selecting a scanning line 33 at the m-th row based on the control signal Ctr1. The scanning line drive circuit 321 outputs the selection signal Gw[m] in the m-th horizontal scanning period of the M horizontal scanning periods included in a frame period defined by the control signal Ctr1. Accordingly, the scanning line drive circuit 321 can sequentially select the scanning lines 33 at the first row to the M-th row in the frame period. The variable m is a natural number that satisfies 1≤m≤M.

The data line drive circuit 322 generates a gradation designating signal Vd[n] designating a gradation to be displayed in the pixels Px based on the image signal Vid, and outputs the generated gradation designating signal Vd[n] to the data line 34 at the n-th column in the m-th horizontal scanning period in which the scanning line 33 at the m-th row is selected by the scanning line drive circuit 321. The variable n is a natural number that satisfies 1≤n≤N. Further, in the present embodiment, the image signal Vid is a signal including the gradation designating signals Vd[1] to Vd[N].

As described above, the drive circuit 32 outputs the selection signal Gw[m] for selecting the scanning line 33 at the m-th row in the m-th horizontal scanning period, and outputs the gradation designating signal Vd[n] to the data line 34 at the n-th column. Thereby, the drive circuit 32 can display a gradation designated by the gradation designating signal Vd[n] with respect to the pixel Px at the m-th row and the n-th column.

Figure 3:
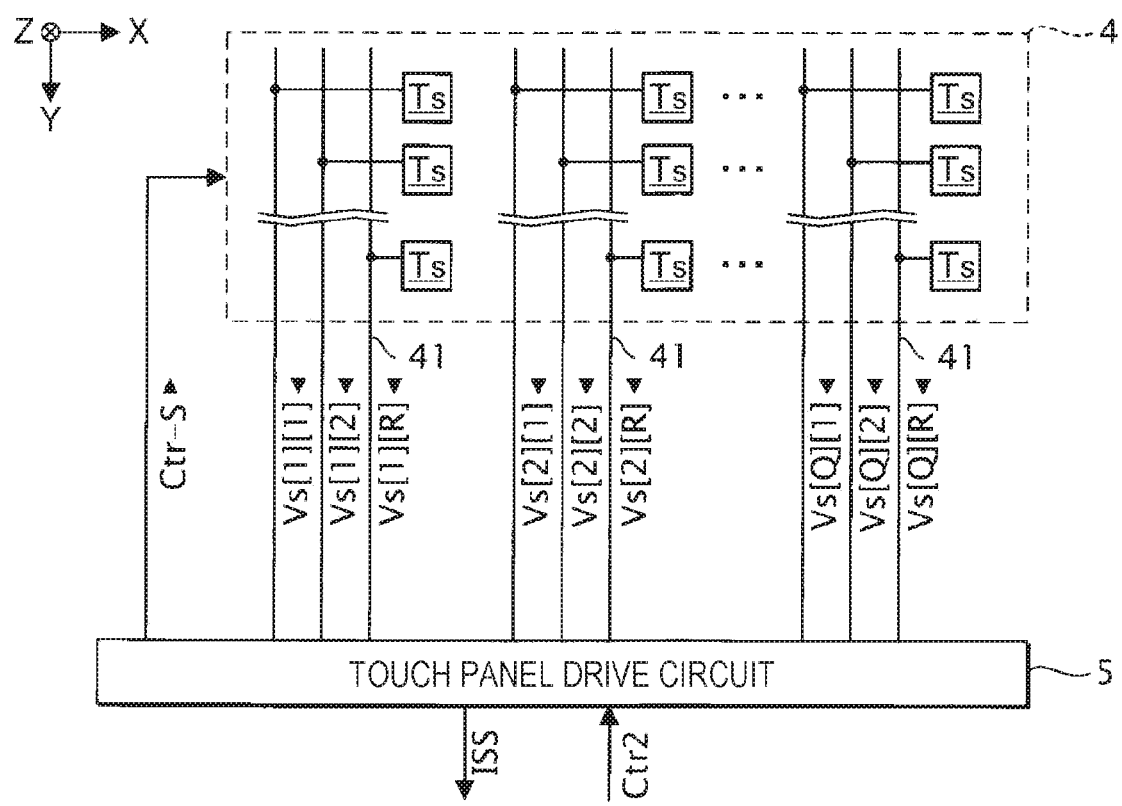
FIG. 3 is a block diagram illustrating an example of a configuration of an electrostatic capacitive touch panel.

FIG. 3 is a block diagram illustrating an example of a configuration of the electrostatic capacitive touch panel 4 and the touch panel drive circuit 5.

As illustrated in FIG. 3, the electrostatic capacitive touch panel 4 includes (Q×R) touch sensors Ts arranged in a matrix of Q columns in the +X direction and R rows in the +Y direction, and (Q×R) detection lines 41 corresponding to (Q×R) touch sensors Ts one-to-one. In the present embodiment, as an example, it is assumed that the value Q is a natural number that satisfies Q≥11 and the value R is a natural number that satisfies R≥19. However, the present disclosure is not limited to such an aspect, and the values Q and R may be natural numbers that at least satisfy "(Q×R) ≥200".

The touch sensor Ts has a capacitive element. When an object contacts the touch sensor Ts, for example, potentials of the two electrodes included in the capacitive element provided in the touch sensor Ts fluctuate.

The touch panel drive circuit 5 generates a control signal Ctr-S based on the control signal Ctr2, and outputs the generated control signal Ctr-S to the electrostatic capacitive touch panel 4. The control signal Ctr-S is a signal for instructing a touch sensor Ts[Q][R] at the q-th row and the r-th column to output a detection signal Vs[Q][R] indicating a potential of one of the two electrodes included in each touch sensor Ts to the detection line 41 that is provided corresponding to the touch sensor Ts[Q][R]. Thereby, the touch panel drive circuit 5 can receive the supply of the (Q×R) detection signals Vs from the (Q×R) touch sensors Ts. The detection signal VSS described above is, for example, a signal including (Q×R) detection signals Vs. The touch panel drive circuit 5 generates the contact position signal ISS based on the (Q×R) detection signals Vs included in the detection signal VSS, and outputs the generated contact position signal ISS to the control unit 2.

In the present embodiment, as an example, it is assumed that the touch panel drive circuit 5 drives the electrostatic capacitive touch panel 4 so that the detection signal Vs is output 100 times or more per second from each touch sensor Ts. However, the present disclosure is not limited to such an aspect, and the touch panel drive circuit 5 only needs to be able to drive the electrostatic capacitive touch panel 4 so that the detection signal Vs is output 90 times or more per second from each touch sensor Ts.

2. Structure of Tablet Terminal

Hereinafter, the structure of the tablet terminal 1 will be described with reference to FIGS. 4 to 7.

Figure 4:
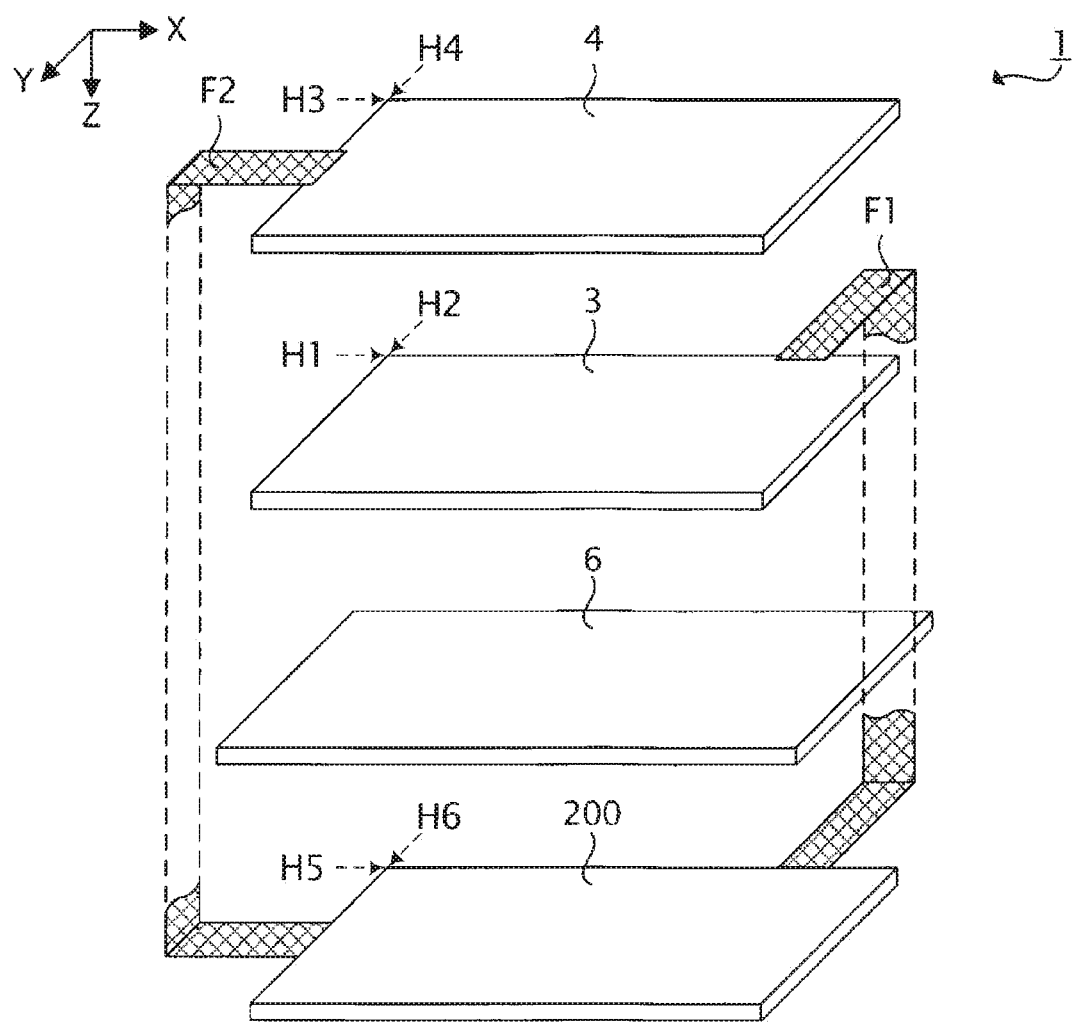
FIG. 4 is an exploded perspective view illustrating an example of a schematic structure of the tablet terminal.
Figure 5:
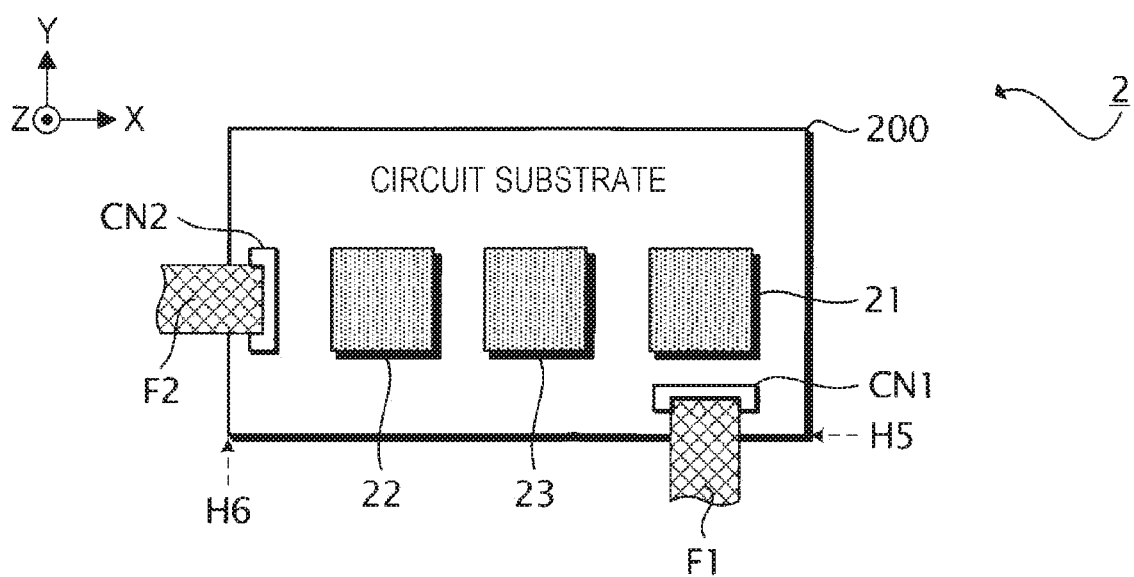
FIG. 5 is a plan view illustrating an example of a schematic structure of the tablet terminal.
Figure 6:
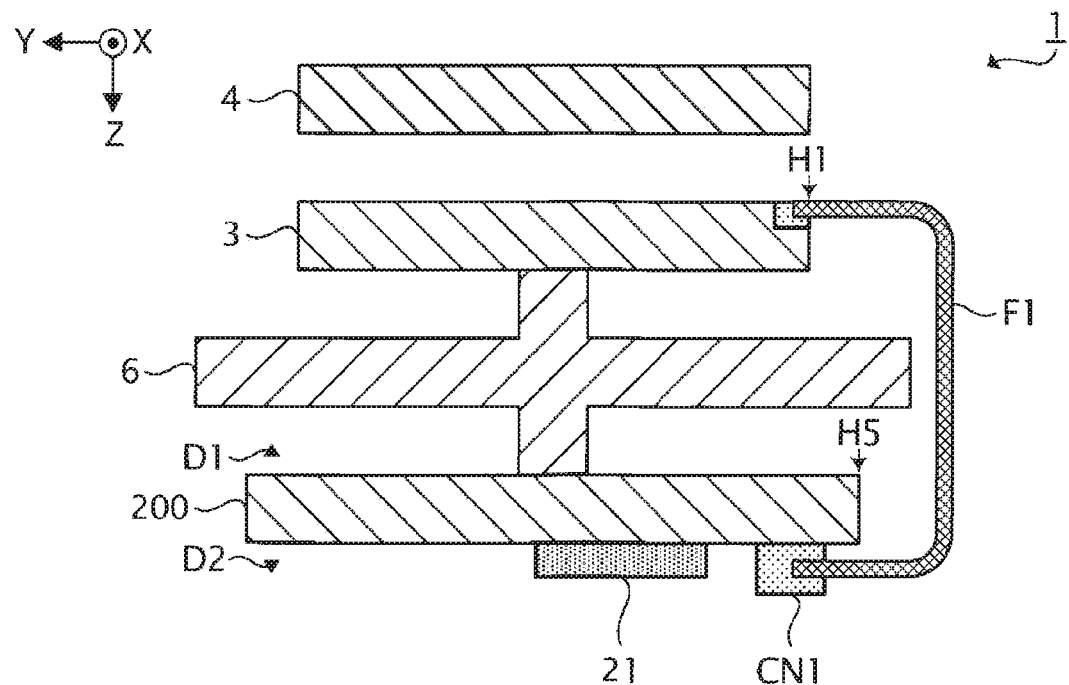
FIG. 6 is a cross-sectional view illustrating an example of a schematic structure of the tablet terminal.
Figure 7:
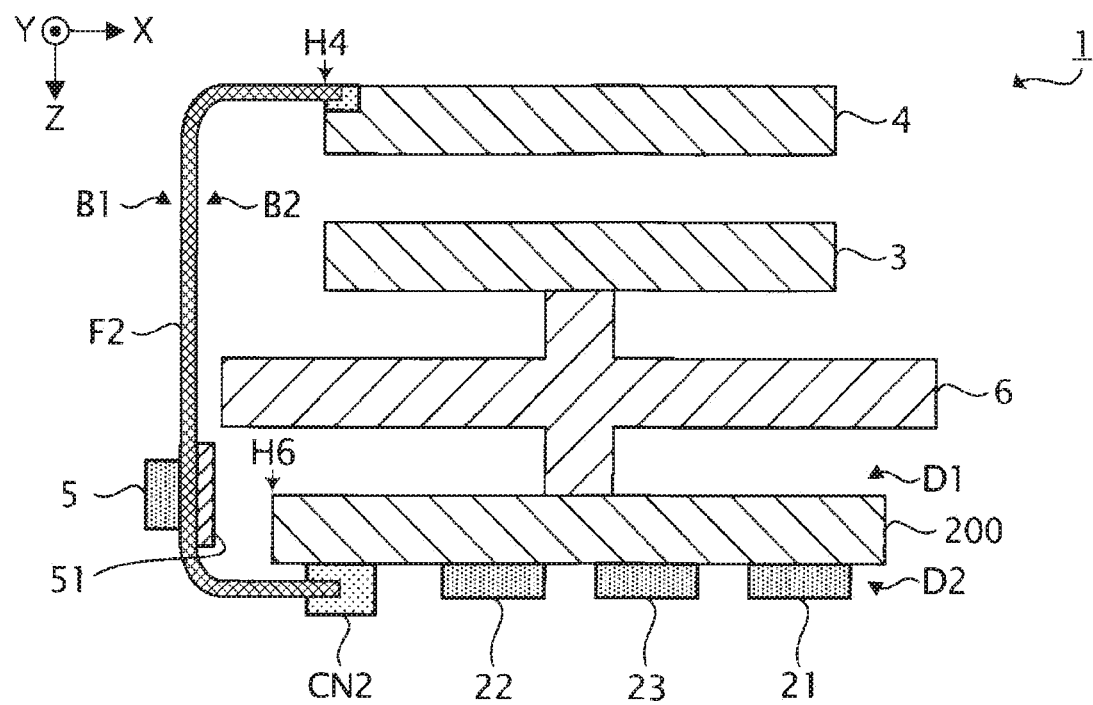
FIG. 7 is a cross-sectional view illustrating an example of a schematic structure of the tablet terminal.

FIG. 4 is an exploded perspective view for explaining an example of the structure of the tablet terminal 1. FIG. 5 is a plan view of the control unit 2 provided in the tablet terminal 1 as viewed from the +Z direction. FIG. 6 is a schematic diagram schematically representing the cross-sectional structure of the tablet terminal 1 when the tablet terminal 1 is viewed from the +X direction. FIG. 7 is a schematic diagram schematically representing the cross-sectional structure of the tablet terminal 1 when the tablet terminal 1 is viewed from the +Y direction.

The tablet terminal 1 includes a metal frame 6, a flexible substrate for a display panel F1, a flexible substrate for a touch panel F2, in addition to the control unit 2, the display panel 3, the electrostatic capacitive touch panel 4, and the touch panel drive circuit 5 described above. The control unit 2 also includes a control substrate 200 provided with a display control circuit 21, a touch panel control circuit 22, and a power supply circuit 23.

As illustrated in FIG. 4, the display panel 3 has a side H1 that extends in the +X direction and a side H2 that extends in the +Y direction when viewed from the −Z direction. In the present embodiment, as an example, it is assumed that the side H1 is longer than the side H2. Further, the electrostatic capacitive touch panel 4 has a side H3 that extends in the +X direction and a side H4 that extends in the +Y direction when viewed from the −Z direction. In this embodiment, as an example, it is assumed that the side H3 is longer than the side H4. The control substrate 200 has a side H5 that extends in the +X direction and a side H6 that extends in the +Y direction when viewed from the −Z direction. In the present embodiment, as an example, it is assumed that the side H5 is longer than the side H6.

Further, in the present embodiment, as illustrated in FIG. 4, it is assumed that the display panel 3 is provided between the electrostatic capacitive touch panel 4 and the metal frame 6, and the metal frame 6 is provided between the display panel 3 and the control substrate 200. In the present embodiment, the display panel 3 and the control substrate 200 are fixed to the metal frame 6.

Further, in the present embodiment, as an example, when viewed from the −Z direction, it is assumed that the electrostatic capacitive touch panel 4, the display panel 3, the metal frame 6, and the control substrate 200 are provided such that a part or all of the electrostatic capacitive touch panel 4 and a part or all of the display panel 3 overlap each other, a part or all of the display panel 3 and a part or all of the metal frame 6 overlap each other, and a part or all of the metal frame 6 and a part or all of the control substrate 200 overlap each other.

In the following, as illustrated in FIGS. 6 and 7, of the two surfaces included in the control substrate 200 that are perpendicular to the +Z direction, a surface on the −Z side is referred to as a surface D1, and a surface on the +Z side is referred to as a surface D2. The surface D1 is fixed to the metal frame 6.

As illustrated in FIG. 4, the flexible substrate for a display panel F1 couples the display panel 3 and the control substrate 200 to each other. Specifically, the flexible substrate for a display panel F1 is provided so as to be coupled to the display panel 3 at the side H1 and intersect the control substrate 200 at the side H5 when viewed from the −Z direction. The flexible substrate for a display panel F1 is coupled to a connector CN1 provided on a surface D2 of the control substrate 200. As illustrated in FIGS. 4, 5 and 6, the flexible substrate for a display panel F1 is provided so as to be coupled to the display panel 3 at the side H1 from the −Y direction, to extend in the +Y direction at a part intersecting the control substrate 200 at the side H5, and to be coupled to the connector CN1 from the −Y direction. Further, in the present embodiment, as illustrated in FIG. 6, it is assumed that the flexible substrate for a display panel F1 passes through the −Y side of the metal frame 6 and the −Y side of the control substrate 200 as an example.

In the present embodiment, the flexible substrate for a display panel F1 is coupled to the display panel 3 at the side H1, but the present disclosure is not limited to such an aspect. The flexible substrate for a display panel F1 may be provided, for example, so as to intersect the display panel 3 at the side H1 and to extend more +Y side than the side H1.

The display control circuit 21 supplies the image signal Vid and the control signal Ctrl to the display panel 3 via the wiring provided on the flexible substrate for a display panel F1. Further, the power supply circuit 23 supplies a drive voltage Pwl to the display panel 3 via the wiring provided on the flexible substrate for a display panel F1.

As illustrated in FIG. 4, the flexible substrate for a touch panel F2 couples the electrostatic capacitive touch panel 4 and the control substrate 200 to each other. Specifically, when viewed from the −Z direction, the flexible substrate for a touch panel F2 is provided so as to be coupled to the electrostatic capacitive touch panel 4 at the side H4 and to intersect the control substrate 200 at the side H6. The flexible substrate for a touch panel F2 is coupled to a connector CN2 provided on the surface D2 of the control substrate 200. As illustrated in FIGS. 4, 5 and 7, the flexible substrate for a touch panel F2 is provided so as to be coupled to the electrostatic capacitive touch panel 4 at the side H4 from the −X direction, to extend in the +X direction at a part intersecting the control substrate 200 at the side H6, and to be coupled to the connector CN2 from the −X direction.

In the present embodiment, the flexible substrate for a touch panel F2 is coupled to the electrostatic capacitive touch panel 4 at the side H4, but the present disclosure is not limited to such an aspect. The flexible substrate for a touch panel F2 may be provided, for example, so as to intersect the electrostatic capacitive touch panel 4 at the side H4 and to extend more +X side than the side H4.

Further, as illustrated in FIG. 7, the flexible substrate for a touch panel F2 has two surfaces that are a surface B1 and a surface B2 which is positioned between the surface B1 and the control substrate 200. The touch panel drive circuit 5 is mounted on the surface B1 of the flexible substrate for a touch panel F2 as a semiconductor element. Further, an antistatic material 51 is provided on the surface B2 of the flexible substrate for a touch panel F2 to prevent the flexible substrate for a touch panel F2 and the touch panel drive circuit 5 from being charged.

The touch panel control circuit 22 supplies the control signal Ctr2 to the touch panel drive circuit 5 via the wiring provided on the flexible substrate for a touch panel F2. The power supply circuit 23 supplies the drive voltage Pw2 to the electrostatic capacitive touch panel 4 and the touch panel drive circuit 5 via the wiring provided on the flexible substrate for a touch panel F2. The touch panel drive circuit 5 supplies the control signal Ctr-S to the electrostatic capacitive touch panel 4 via the wiring provided on the flexible substrate for a touch panel F2 and outputs the contact position signal ISS to the control unit 2. Further, the electrostatic capacitive touch panel 4 supplies the detection signal VSS to the touch panel drive circuit 5 via the wiring provided on the flexible substrate for a touch panel F2.

As can be understood from FIG. 5, the flexible substrate for a display panel F1 and the flexible substrate for a touch panel F2 are provided so that the flexible substrate for a display panel F1 and the flexible substrate for a touch panel F2 do not overlap each other when viewed from the Z axis direction. Further, the flexible substrate for a display panel F1 and the flexible substrate for a touch panel F2 are provided such that a direction in which the flexible substrate for a display panel F1 extends and a direction in which the flexible substrate for a touch panel F2 extends, are substantially orthogonal to each other when viewed from the −Z direction. The term "substantially orthogonal" is a concept including not only the case of being orthogonal but also the case of being orthogonal in design, and the case of being considered to be orthogonal except for an error such as a manufacturing error.

3. Comparative Example

Hereinafter, in order to clarify the effect of the present embodiment, the structure of a tablet terminal 1Z according to a comparative example will be described with reference to FIGS. 8 and 9.

Figure 8:
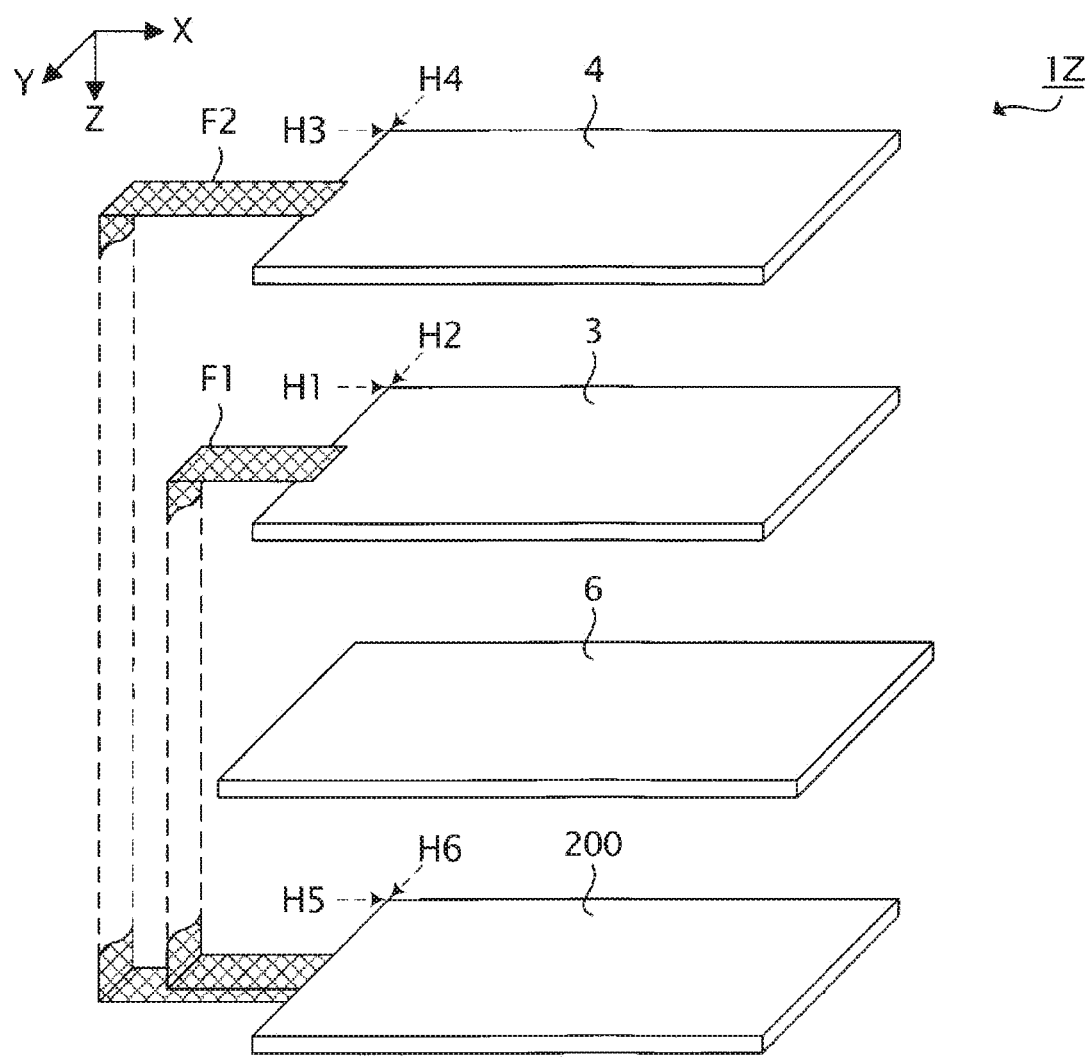
FIG. 8 is an exploded perspective view illustrating an example of a schematic structure of a tablet terminal according to a comparative example.

FIG. 8 is an exploded perspective view for explaining an example of the structure of the tablet terminal 1Z according to the comparative example. FIG. 9 is a schematic diagram schematically representing the cross-sectional structure of the tablet terminal 1Z when the tablet terminal 1Z is viewed from the +Y direction.

Figure 9:
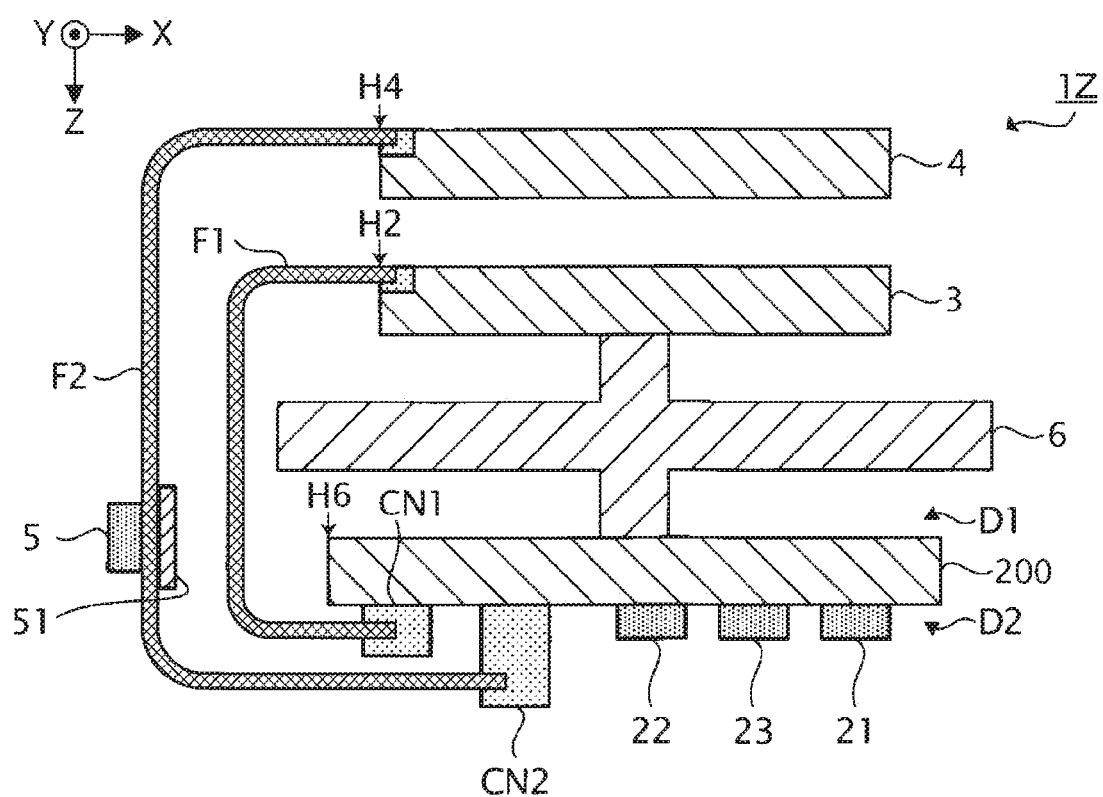
FIG. 9 is a cross-sectional view illustrating an example of a schematic structure of the tablet terminal according to a comparative example.

As illustrated in FIGS. 8 and 9, in the tablet terminal 1Z according to the comparative example, the flexible substrate for a display panel F1 is provided so as to be coupled to the display panel 3 at the side H2 and to intersect the control substrate 200 at the side H6 when viewed from the −Z direction, and the flexible substrate for a touch panel F2 is provided so as to be coupled to the electrostatic capacitive touch panel 4 at the side H4 and to intersect the control substrate 200 at the side H6 when viewed from the −Z direction. More specifically, in the tablet terminal 1Z according to the comparative example, the flexible substrate for a display panel F1 is provided so as to be coupled to the display panel 3 at the side H2 from the −X direction, to extend in the +X direction at a part intersecting the control substrate 200 at the side H6, and to be coupled to the connector CN1 from the −X direction. Further, in the tablet terminal 1Z according to the comparative example, the flexible substrate for a touch panel F2 is provided so as to be coupled to the electrostatic capacitive touch panel 4 at the side H4 from the −X direction, to extend in the +X direction at a part intersecting the control substrate 200 at the side H6, and to be coupled to the connector CN2 from the −X direction. Furthermore, in the tablet terminal 1Z according to the comparative example, the flexible substrate for a display panel F1 and the flexible substrate for a touch panel F2 are provided so that the flexible substrate for a display panel F1 and the flexible substrate for a touch panel F2 overlap each other when viewed from the −Z direction.

In the tablet terminal 1Z according to the comparative example, when a current flows through the wiring provided on the flexible substrate for a display panel F1, an annular-shape magnetic field is generated on a plane perpendicular to the wiring in a direction perpendicular to the wiring. In the tablet terminal 1Z according to the comparative example, the flexible substrate for a display panel F1 and the flexible substrate for a touch panel F2 overlap each other when viewed from the −Z direction, and the flexible substrate for a display panel F1 and the flexible substrate for a touch panel F2 are provided so as to be substantially parallel to each other. Therefore, an induced electromotive force is generated in the wiring provided on the flexible substrate for a touch panel F2 due to the influence of the magnetic field generated due to the current flowing in the wiring provided on the flexible substrate for a display panel F1. Therefore, in the tablet terminal 1Z according to the comparative example, there is a problem in that a magnetic field is generated due to the image signal Vid transmitted by the wiring provided on the flexible substrate for a display panel F1, the induced electromotive force based on the magnetic field is superimposed on the detection signal VSS transmitted by the wiring provided on the flexible substrate for a touch panel F2 as noise, and thus the detection result of the touch on the electrostatic capacitive touch panel 4 cannot be accurately grasped.

In contrast to this, in the tablet terminal 1 according to the present embodiment, the flexible substrate for a display panel F1 and the flexible substrate for a touch panel F2 are provided so as not to overlap each other when viewed from the −Z direction. Therefore, according to the present embodiment, compared with the comparative example, the influence of the magnetic field generated due to the current flowing through the wiring provided on the flexible substrate for a display panel F1 with respect to the signal transmitted by the wiring provided on the flexible substrate for a touch panel F2 can be reduced.

Further, in the tablet terminal 1 according to the present embodiment, the flexible substrate for a display panel F1 and the flexible substrate for a touch panel F2 are provided so as to be substantially orthogonal to each other when viewed from the −Z direction. Therefore, according to the present embodiment, compared with the comparative example, the influence of the magnetic field generated due to the current flowing through the wiring provided on the flexible substrate for a display panel F1 with respect to the signal transmitted by the wiring provided on the flexible substrate for a touch panel F2 can be reduced.

As described above, according to the present embodiment, it is possible to reduce the possibility that the detection result of the touch on the electrostatic capacitive touch panel 4 cannot be accurately grasped, as compared with the case of the comparative example.

4. Round-Up of Embodiment

As described above, the tablet terminal 1 according to the present embodiment includes the display panel 3 having the side H1 that extends in the X axis direction and the side H2 that extends in the Y axis direction, the electrostatic capacitive touch panel 4 having the side H3 that extends in the X axis direction and the side H4 that extends in the Y axis direction, a control substrate 200 having the side H5 that extends in the X axis direction and the side H6 that extends in the Y axis direction, a flexible substrate for a display panel F1 which is pulled out from the side H1 of the display panel 3, intersects with the side H5, and is coupled to the control substrate 200, and a flexible substrate for a touch panel F2 which is pulled out from the side H4 of the electrostatic capacitive touch panel 4, intersects with the side H6, and is coupled to the control substrate 200.

That is, according to the present embodiment, since the flexible substrate for a display panel F1 and the flexible substrate for a touch panel F2 do not overlap with each other when viewed from the Z axis direction, as compared with the case where the flexible substrate for a display panel F1 and the flexible substrate for a touch panel F2 overlap each other when viewed from the Z axis direction, the noise that is superimposed on the signal transmitted by the flexible substrate for a touch panel F2 due to the signal transmitted by the flexible substrate for a display panel F1 can be reduced.

Further, according to the present embodiment, the direction in which the flexible substrate for a display panel F1 extends can be made to intersect with the direction in which the flexible substrate for a touch panel F2 extends. That is, according to the present embodiment, as compared with the case where the direction in which the flexible substrate for a display panel F1 extends and the direction in which the flexible substrate for a touch panel F2 extends are substantially parallel, the noise that is superimposed on the signal transmitted by the flexible substrate for a touch panel F2 due to the signal transmitted by the flexible substrate for a display panel F1 can be reduced.

As described above, according to the present embodiment, the situation in which the detection result of the touch on the electrostatic capacitive touch panel 4 cannot be accurately grasped, is able to be prevented.

In the present embodiment, the tablet terminal 1 is an example of "a display device with an electrostatic capacitive touch panel", the control substrate 200 is an example of "a circuit substrate", the flexible substrate for a display panel F1 is an example of "a first flexible substrate", the flexible substrate for a touch panel F2 is an example of "a second flexible substrate", the +Y direction or the −Y direction is an example of "a first direction", the +X direction or the −X direction is an example of "a second direction", the side H6 is an example of "a first side", and the side H5 is an example of "a second side".

Further, in the tablet terminal 1 according to the present embodiment, the display panel 3 is provided between the electrostatic capacitive touch panel 4 and the control substrate 200.

According to the present embodiment, as compared with the case where the electrostatic capacitive touch panel 4 is provided between the display panel 3 and the control substrate 200, the noise propagating from the control substrate 200 to the electrostatic capacitive touch panel 4 can be reduced. That is, according to the present embodiment, the situation in which the detection result of the touch on the electrostatic capacitive touch panel 4 cannot be accurately grasped, is able to be prevented.

Further, in the tablet terminal 1 according to the present embodiment, the flexible substrate for a display panel F1 extends in the Y axis direction at a part intersecting the side H5 of the control substrate 200, the flexible substrate for a touch panel F2 extends in the X axis direction at a part intersecting the side H6 of the control substrate 200, and the Y axis direction is a direction substantially orthogonal to the X axis direction.

That is, according to the present embodiment, since the flexible substrate for a display panel F1 and the flexible substrate for a touch panel F2 are substantially orthogonal to each other, as compared with the case where the flexible substrate for a display panel F1 and the flexible substrate for a touch panel F2 are not substantially orthogonal to each other, the noise that is superimposed on the signal transmitted by the flexible substrate for a touch panel F2 due to the signal transmitted by the flexible substrate for a display panel F1 can be reduced. Therefore, according to the present embodiment, the situation in which the detection result of the touch on the electrostatic capacitive touch panel 4 cannot be accurately grasped, is able to be prevented.

Further, in the tablet terminal 1 according to the present embodiment, the touch panel drive circuit 5 that drives the electrostatic capacitive touch panel 4 is provided on the surface B1 of the two surfaces included in the flexible substrate for a touch panel F2.

According to the present embodiment, for example, the electrical distance between the electrostatic capacitive touch panel 4 and the touch panel drive circuit 5 can be made shorter as compared with the case where the touch panel drive circuit 5 is provided on the control substrate 200. Therefore, according to the present embodiment, for example, as compared with the case where the touch panel drive circuit 5 is provided on the control substrate 200, the noise superimposed on the signal for driving the electrostatic capacitive touch panel 4 can be reduced. In this way, according to the present embodiment, it is possible to reduce the possibility of a malfunction in the electrostatic capacitive touch panel 4 and to detect the contact of an object with the electrostatic capacitive touch panel 4 with high accuracy.

In the present embodiment, the surface B1 is an example of "one surface".

Further, in the tablet terminal 1 according to the present embodiment, of the two surfaces included in the flexible substrate for a touch panel F2, the surface B2 opposite to the surface B1 is provided with an antistatic material 51 for preventing electrification in the flexible substrate for a touch panel F2 and the touch panel drive circuit 5, and the surface B2 is a surface on the control substrate 200 side of the two surfaces included in the flexible substrate for a touch panel F2.

According to the present embodiment, as compared with the case where the antistatic material 51 is not provided, the noise propagating from the control unit 2 including the control substrate 200 to the touch panel drive circuit 5 can be reduced. Therefore, according to the present embodiment, it is possible to reduce the possibility of a malfunction in the electrostatic capacitive touch panel 4 and to detect the contact of an object with the electrostatic capacitive touch panel 4 with high accuracy.

In the present embodiment, the surface B2 is an example of "the other surface".

Further, the tablet terminal 1 according to the present embodiment has a metal frame 6 to which the display panel 3 and the control substrate 200 are fixed.

According to the present embodiment, even when the tablet terminal 1 resonates, a relative position of the display panel 3 with respect to the control substrate 200 can be suppressed from changing. Therefore, according to the present embodiment, it is possible to suppress the break down of the tablet terminal 1 caused by the change in the relative position of the display panel 3 with respect to the control substrate 200.

Further, in the tablet terminal 1 according to the present embodiment, the control substrate 200 is provided with the power supply circuit 23 that supplies the drive voltage Pw1 that drives the display panel 3 to the display panel 3 and the drive voltage Pw2 that drives the electrostatic capacitive touch panel 4 to the electrostatic capacitive touch panel 4, and the drive voltage Pw1 is higher than the drive voltage Pw2.

In general, when the drive voltage Pw1 that drives the display panel 3 is higher than the drive voltage Pw2 that drives the electrostatic capacitive touch panel 4, compared to when the voltage is lower, the influence of the noise caused by the signal that drives the display panel 3 on the signal indicating the detection result of the contact of the object in the electrostatic capacitive touch panel 4 becomes large.

In contrast to this, in the present embodiment, the flexible substrate for a display panel F1 and the flexible substrate for a touch panel F2 do not overlap with each other when viewed from the Z axis direction, and the flexible substrate for a display panel F1 and the flexible substrate for a touch panel F2 are provided in directions intersecting with each other. Therefore, according to the present embodiment, even when the drive voltage Pw1 is higher than the drive voltage Pw2, the noise that is superimposed on the signal transmitted by the flexible substrate for a touch panel F2 due to the signal that drives the display panel 3 transmitted by the flexible substrate for a display panel F1 can be reduced. That is, according to the present embodiment, even when the drive voltage Pw1 is higher than the drive voltage Pw2, the situation in which the detection result of the touch on the electrostatic capacitive touch panel 4 cannot be accurately grasped, is able to be prevented.

In the present embodiment, the drive voltage Pw1 is an example of "a first drive voltage" and the drive voltage Pw2 is an example of "a second drive voltage".

Further, in the tablet terminal 1 according to the present embodiment, the side H5 is longer than the side H6.

Generally, the number of pixels Px provided on the display panel 3 is larger than the number of touch sensors Ts provided on the electrostatic capacitive touch panel 4. Therefore, generally, the number of signals transmitted and received between the display panel 3 and the control substrate 200 is larger than the number of signals transmitted and received between the electrostatic capacitive touch panel 4 and the control substrate 200. Therefore, in general, the flexible substrate for a display panel F1 that couples the display panel 3 and the control substrate 200 to each other is thicker than the flexible substrate for a touch panel F2 that couples the electrostatic capacitive touch panel 4 and the control substrate 200 to each other.

In contrast to this, in the present embodiment, the side H5 intersecting the flexible substrate for a display panel F1 is longer than the side H6 intersecting the flexible substrate for a touch panel F2. Therefore, according to the present embodiment, it is possible to reduce the work load when the flexible substrate for a display panel F1 and the flexible substrate for a touch panel F2 are attached to the tablet terminal 1.

Further, in the tablet terminal 1 according to the present embodiment, the display panel 3 has 300 or more pixels Px arranged in the X axis direction and 200 or more pixels Px arranged in the Y axis direction.

In general, when the number of pixels Px provided on the display panel 3 is large, as compared with the case where the number of pixels is small, the influence of the noise caused by the signal that drives the display panel 3 on the signal indicating the detection result of the contact of the object in the electrostatic capacitive touch panel 4 becomes large.

In contrast to this, in the present embodiment, the flexible substrate for a display panel F1 and the flexible substrate for a touch panel F2 do not overlap with each other when viewed from the Z axis direction, and the flexible substrate for a display panel F1 and the flexible substrate for a touch panel F2 are provided in directions intersecting with each other. Therefore, according to the present embodiment, even when the number of pixels Px provided on the display panel 3 is large, the noise that is superimposed on the signal transmitted by the flexible substrate for a touch panel F2 due to the signal that drives the display panel 3 transmitted by the flexible substrate for a display panel F1 can be reduced. That is, according to the present embodiment, even when the number of pixels Px provided on the display panel 3 is large, the situation in which the detection result of the touch on the electrostatic capacitive touch panel 4 cannot be accurately grasped, is able to be prevented.

Further, in the tablet terminal 1 according to the present embodiment, the display panel 3 has a size of 4 inches or more.

According to the present embodiment, even when the number of pixels Px provided on the display panel 3 is large, the situation in which the detection result of the touch on the electrostatic capacitive touch panel 4 cannot be accurately grasped, is able to be prevented.

Further, in the tablet terminal 1 according to the present embodiment, the electrostatic capacitive touch panel 4 has 200 or more touch sensors Ts.

In the present embodiment, since the flexible substrate for a display panel F1 and the flexible substrate for a touch panel F2 do not overlap with each other and the flexible substrate for a display panel F1 and the flexible substrate for a touch panel F2 are provided in a direction intersecting with each other when viewed from the Z axis direction, the noise that is superimposed on the signal transmitted by the flexible substrate for a display panel F1 due to the signal transmitted by the flexible substrate for a touch panel F2 can be reduced. Therefore, according to the present embodiment, even when the number of touch sensors Ts provided on the electrostatic capacitive touch panel 4 is large, it is possible to suppress the occurrence of a malfunction in the display panel 3.

Further, in the tablet terminal 1 according to the present embodiment, the touch sensor Ts provided in the electrostatic capacitive touch panel 4 can detect the presence/absence of contact with the touch sensor Ts 90 times or more per second.

According to the present embodiment, the noise that is superimposed on the signal transmitted by the flexible substrate for a display panel F1 due to the signal transmitted by the flexible substrate for a touch panel F2 can be reduced. Therefore, according to the present embodiment, even when the number of signals transmitted and received by the flexible substrate for a touch panel F2 is large, it is possible to suppress the occurrence of a malfunction in the display panel 3.

B. Modification Example

Each of the above embodiments can be variously modified. Specific aspects of modification will be exemplified below. Two or more aspects selected from the following exemplifications can be appropriately merged within a range not inconsistent with each other. In the modification examples illustrated below, the elements having the same operations and functions as those of the embodiment will be denoted by the reference numerals referred to in the above description, and detailed description thereof will be appropriately omitted.

Modification Example 1

In the above-described embodiment, among the plurality of sides included in the control substrate 200, the side where the flexible substrate for a display panel F1 intersects and the side where the flexible substrate for a touch panel F2 intersects are sides adjacent to each other has been illustrated, but the present disclosure is not limited to such an aspect. Among the plurality of sides included in the control substrate 200, the side where the flexible substrate for a display panel F1 intersects and the side where the flexible substrate for a touch panel F2 intersects may be sides that face each other.

Figure 10:
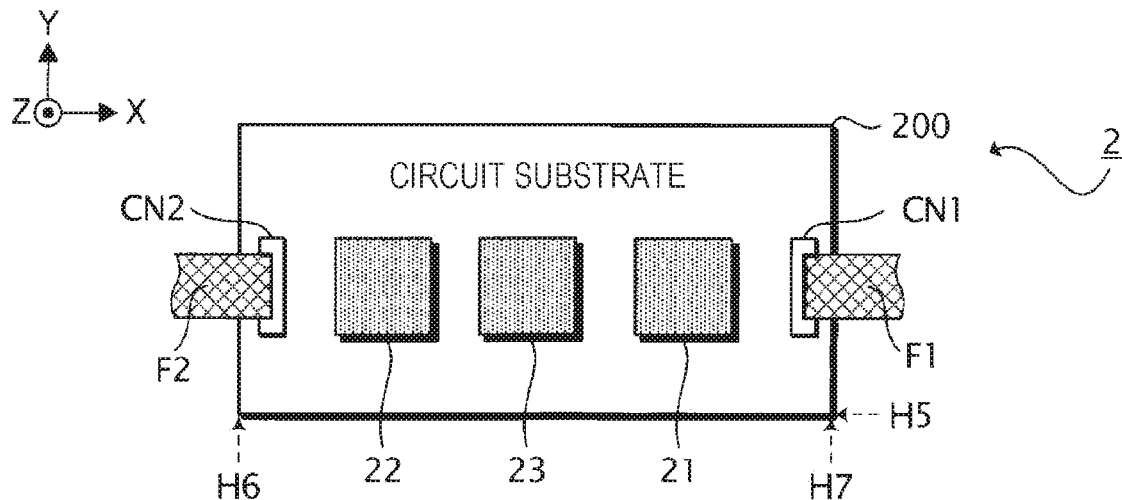
FIG. 10 is a plan view illustrating an example of a schematic structure of a tablet terminal according to Modification Example 1.

FIG. 10 is a plan view of the tablet terminal 1 according to the present modification example, viewed from the +Z direction.

As illustrated in FIG. 10, in the tablet terminal 1 according to the present modification example, the flexible substrate for a touch panel F2 intersects with the side H6 included in the control substrate 200 when viewed from the Z axis direction, and the flexible substrate for a display panel F1 faces the side H6 and intersects the side H7 extends in the Y axis direction among the plurality of sides included in the control substrate 200 when viewed from the Z axis direction.

In the present modification example, the directions in which the flexible substrate for a display panel F1 and the flexible substrate for a touch panel F2 extend, are both the X axis direction, and as compared with the comparative example, the distance between the flexible substrate for a display panel F1 and the flexible substrate for a touch panel F2 is wide. Therefore, according to this modification example, as compared with the comparative example, it is possible to reduce the influence of the magnetic field generated due to the current flowing through the wiring provided on the flexible substrate for a display panel F1 on the signal transmitted by the wiring provided on the flexible substrate for a touch panel F2. That is, according to the modification example, as compared with the comparative example, it is possible to reduce the possibility that the detection result of the touch on the electrostatic capacitive touch panel 4 cannot be accurately grasped.

Modification Example 2

In the above-described embodiment and Modification Example 1, among the plurality of sides included in the control substrate 200, the side where the flexible substrate for a display panel F1 intersects and the side where the flexible substrate for a touch panel F2 intersects are different sides has been illustrated, but the present disclosure is not limited to such an aspect. Among the plurality of sides included in the control substrate 200, the side where the flexible substrate for a display panel F1 intersects and the side where the flexible substrate for a touch panel F2 intersects may be the same side. In this case, the flexible substrate for a display panel F1 and the flexible substrate for a touch panel F2 may be provided so as not to overlap each other when viewed in the Z axis direction.

Figure 11:
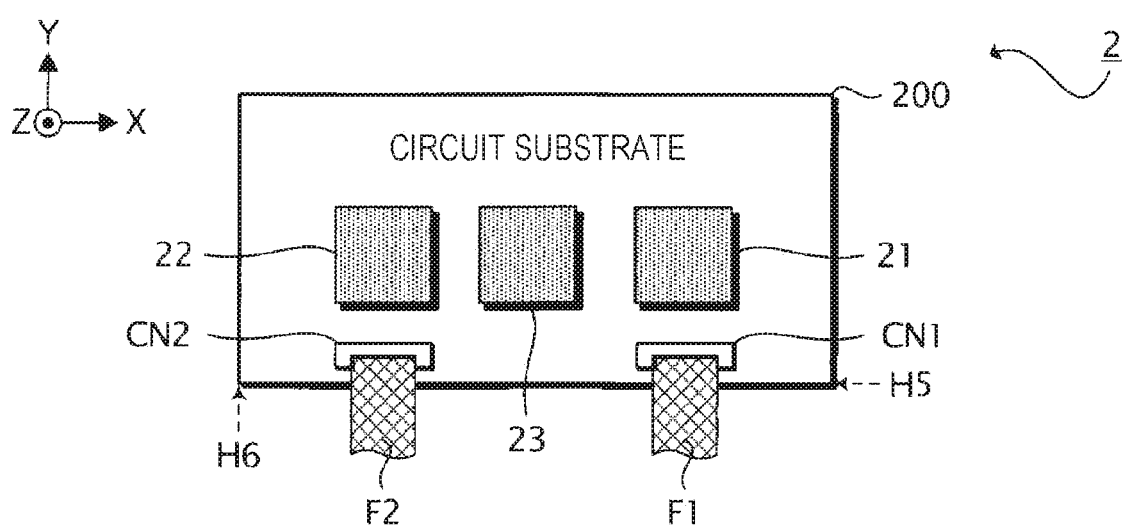
FIG. 11 is a plan view illustrating an example of a schematic structure of a tablet terminal according to Modification Example 2.

FIG. 11 is a plan view of the tablet terminal 1 according to the present modification example, viewed from the +Z direction.

As illustrated in FIG. 11, in the tablet terminal 1 according to the present modification example, the flexible substrate for a touch panel F2 intersects with the side H5 included in the control substrate 200 when viewed from the Z axis direction, and the flexible substrate for a display panel F1 intersects with the side H5 among the plurality of sides included in the control substrate 200 and does not overlap the flexible substrate for a touch panel F2 when viewed from the Z axis direction.

In the present modification example, the directions in which the flexible substrate for a display panel F1 and the flexible substrate for a touch panel F2 extend, are both the Y axis direction, and as compared with the comparative example, the distance between the flexible substrate for a display panel F1 and the flexible substrate for a touch panel F2 is wide. Therefore, according to this modification example, as compared with the comparative example, it is possible to reduce the influence of the magnetic field generated due to the current flowing through the wiring provided on the flexible substrate for a display panel F1 on the signal transmitted by the wiring provided on the flexible substrate for a touch panel F2. That is, according to the modification example, as compared with the comparative example, it is possible to reduce the possibility that the detection result of the touch on the electrostatic capacitive touch panel 4 cannot be accurately grasped.

Modification Example 3

In the above-described embodiment and the Modification Examples 1 and 2, the case where the flexible substrate for a display panel F1 passes outside the area surrounded by the plurality of sides included in the metal frame 6 in the plane where the metal frame 6 is present and is perpendicular to the Z axis direction, has been illustrated. That is, in the above-described embodiment and the Modification Examples 1 and 2, the case where the flexible substrate for a display panel F1 passes more −Y side than the metal frame 6 in the plane where the metal frame 6 is present and is perpendicular to the Z axis direction, has been illustrated. However, the present disclosure is not limited to such an aspect, and the flexible substrate for a display panel F1 may pass through the area surrounded by the plurality of sides included in the metal frame 6 in a plane where the metal frame 6 is present and is perpendicular to the Z axis direction.

Figure 12:
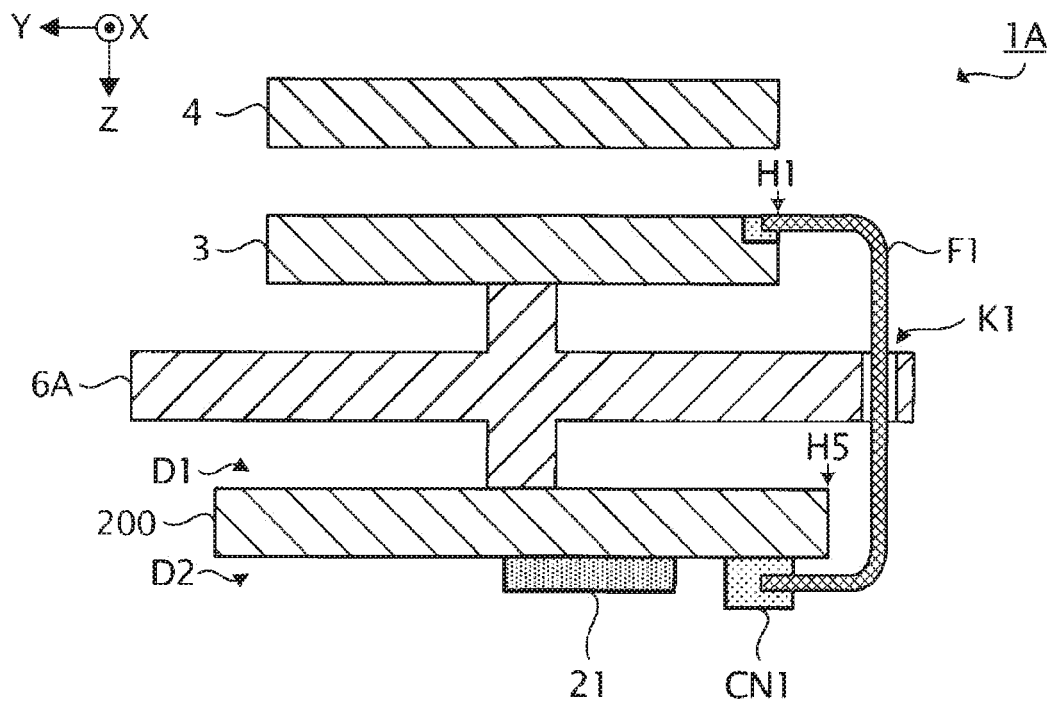
FIG. 12 is a cross-sectional view illustrating an example of a schematic structure of a tablet terminal according to Modification Example 3.

FIG. 12 is a schematic diagram schematically representing the cross-sectional structure of the tablet terminal 1A when the tablet terminal 1A according to the present modification example is viewed from the +X direction. The tablet terminal 1A differs from the tablet terminal 1 according to the embodiment in that a metal frame 6A is provided instead of the metal frame 6.

As illustrated in FIG. 12, the metal frame 6A has a through hole K1 penetrating a surface on the +Z side included in the metal frame 6A and a surface on the −Z side included in the metal frame 6A. In the tablet terminal 1A, the flexible substrate for a display panel F1 is provided so as to pass through the through hole K1. In the tablet terminal 1A, as in the tablet terminal 1 according to the embodiment, the flexible substrate for a touch panel F2 passes through more −X side than the metal frame 6A and does not pass through the through hole K1, as illustrated in FIG. 7.

That is, the tablet terminal 1A according to the present modification example includes the display panel 3 that displays an image, the electrostatic capacitive touch panel 4 that detects the presence/absence of contact, the control substrate 200 provided with a control circuit that controls the display panel 3 and the electrostatic capacitive touch panel 4, the metal frame 6A having the through hole K1 and provided between the display panel 3 and the control substrate 200, the flexible substrate for a display panel F1 that passes through the through hole K1 and couples the display panel 3 and the control substrate 200 to each other, and the flexible substrate for a touch panel F2 provided with the touch panel drive circuit 5 that receives a signal output from the electrostatic capacitive touch panel 4 and couples the electrostatic capacitive touch panel 4 and the control substrate 200 to each other without passing through the through hole K1.

In this modification example, the flexible substrate for a display panel F1 and the flexible substrate for a touch panel F2 are provided so that the flexible substrate for a display panel F1 passes through the through hole K1 and the flexible substrate for a touch panel F2 does not pass through the through hole K1. Therefore, also in the present modification example, as in the above-described embodiment, the flexible substrate for a display panel F1 and the flexible substrate for a touch panel F2 can be provided so that the flexible substrate for a display panel F1 and the flexible substrate for a touch panel F2 do not overlap each other when viewed from the Z axis direction. That is, according to this modification example, as compared with the comparative example, it is possible to reduce the influence of the magnetic field generated due to the current flowing through the wiring provided on the flexible substrate for a display panel F1 on the signal transmitted by the wiring provided on the flexible substrate for a touch panel F2.

Further, according to the present modification example, since the flexible substrate for a touch panel F2 is provided so as not to pass through the through hole K1, as compared with the case where the flexible substrate for a touch panel F2 passes through the through hole K1, the possibility that the touch panel drive circuit 5 provided on the flexible substrate for a touch panel F2 is damaged can be reduced when the flexible substrate for a touch panel F2 is attached to the tablet terminal 1A.

In the present modification example, the through hole K1 is an example of "a first opening portion".

Modification Example 4

In the above-described embodiment and the Modification Examples 1 to 3, the case where the flexible substrate for a display panel F1 passes outside the area surrounded by the plurality of sides included in the control substrate 200 in the plane where the control substrate 200 is present and is perpendicular to the Z axis direction, has been illustrated. That is, in the above-described embodiment and the Modification Examples 1 to 3, the case where the flexible substrate for a display panel F1 passes more −Y side than the control substrate 200 in the plane where the control substrate 200 is present and is perpendicular to the Z axis direction, has been illustrated. However, the present disclosure is not limited to such an aspect, and the flexible substrate for a display panel F1 may pass through the area surrounded by the plurality of sides included in the control substrate 200 in a plane where the control substrate 200 is present and is perpendicular to the Z axis direction.

Figure 13:
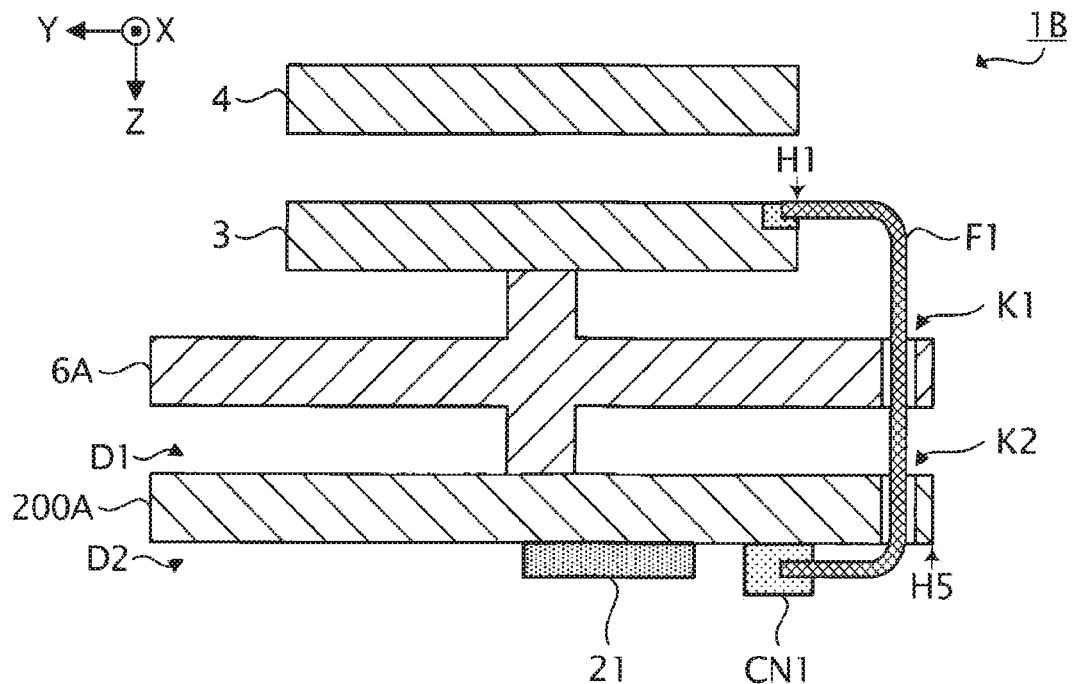
FIG. 13 is a cross-sectional view illustrating an example of a schematic structure of a tablet terminal according to Modification Example 4.

FIG. 13 is a schematic diagram schematically representing the cross-sectional structure of the tablet terminal 1B when the tablet terminal 1B according to the present modification example is viewed from the +X direction. The tablet terminal 1B differs from the tablet terminal 1 according to the embodiment in that a metal frame 6A is provided instead of the metal frame 6 and a control substrate 200A is provided instead of the control substrate 200.

As illustrated in FIG. 13, the control substrate 200A has a through hole K2 penetrating the surfaces D1 and D2 included in the metal frame 6A. In the tablet terminal 1B, the flexible substrate for a display panel F1 is provided so as to pass through the through holes K1 and K2. In the tablet terminal 1B, as in the tablet terminal 1 according to the embodiment, the flexible substrate for a touch panel F2 passes through more −X side than the metal frame 6A and the control substrate 200A, and does not pass through the through holes K1 and K2, as illustrated in FIG. 7.

In the present embodiment, among the sides constituting the through hole K2, the side substantially parallel to the side H5 may be interpreted as "a fifth side".

That is, the tablet terminal 1B according to the present modification example includes the display panel 3 that displays an image, the electrostatic capacitive touch panel 4 that detects the presence/absence of contact, the control substrate 200A provided with a control circuit that controls the display panel 3 and the electrostatic capacitive touch panel 4, the metal frame 6A having the through hole K1 and provided between the display panel 3 and the control substrate 200A, the flexible substrate for a display panel F1 that passes through the through hole K1 and couples the display panel 3 and the control substrate 200A to each other, and the flexible substrate for a touch panel F2 provided with the touch panel drive circuit 5 that receives a signal output from the electrostatic capacitive touch panel 4 and couples the electrostatic capacitive touch panel 4 and the control substrate 200A to each other without passing through the through hole K1 in which the control substrate 200A has a through hole K2, the flexible substrate for a display panel F1 passes through the through hole K2, and the flexible substrate for a touch panel F2 does not pass through the through hole K2.

In this modification example, the flexible substrate for a display panel F1 and the flexible substrate for a touch panel F2 are provided so that the flexible substrate for a display panel F1 passes through the through holes K1 and K2 and the flexible substrate for a touch panel F2 does not pass through the through holes K1 and K2. Therefore, also in the present modification example, as in the above-described embodiment, the flexible substrate for a display panel F1 and the flexible substrate for a touch panel F2 can be provided so that the flexible substrate for a display panel F1 and the flexible substrate for a touch panel F2 do not overlap each other when viewed from the Z axis direction. That is, according to this modification example, as compared with the comparative example, it is possible to reduce the influence of the magnetic field generated due to the current flowing through the wiring provided on the flexible substrate for a display panel F1 on the signal transmitted by the wiring provided on the flexible substrate for a touch panel F2.

Further, according to the present modification example, since the flexible substrate for a touch panel F2 is provided so as not to pass through the through holes K1 and K2, as compared with the case where the flexible substrate for a touch panel F2 passes through the through holes K1 and K2, the possibility that the touch panel drive circuit 5 provided on the flexible substrate for a touch panel F2 is damaged can be reduced when the flexible substrate for a touch panel F2 is attached to the tablet terminal 1B.

In the present modification example, the through hole K2 is an example of "a second opening portion".

In the tablet terminal 1B according to the present modification example, the surface D1 of the two surfaces included in the control substrate 200A is fixed to the metal frame 6A, and the surface D2, of the two surfaces included in the control substrate 200A, opposite to the surface D1 is provided with a connector CN1 to which the flexible substrate for a display panel F1 is coupled and a connector CN2 to which the flexible substrate for a touch panel F2 is coupled.

In the tablet terminal 1B according to this modification example, since the connector CN1 to which the flexible substrate for a display panel F1 is coupled and the connector CN2 to which the flexible substrate for a touch panel F2 is coupled are provided on the surface D2 on which the display control circuit 21, the touch panel control circuit 22, and the power supply circuit 23 are disposed, the wiring in the control substrate 200A can be simplified as compared with the case where the connector CN1 and the connector CN2 are provided on the surface D1.

In this modification example, the surface D1 is an example of "a first surface", the surface D2 is an example of "a second surface", the connector CN1 is an example of "a first connector", and the connector CN2 is an example of "a second connector".

Modification Example 5

In the above-described embodiment and Modification Examples 1 to 3, the case where the connector CN1 is provided on the surface D2 of the two surfaces included in the control substrate 200 is illustrated. However, the present disclosure is not limited to such an aspect, and the connector CN1 may be provided on the surface D1 of the control substrate 200.

Figure 14:
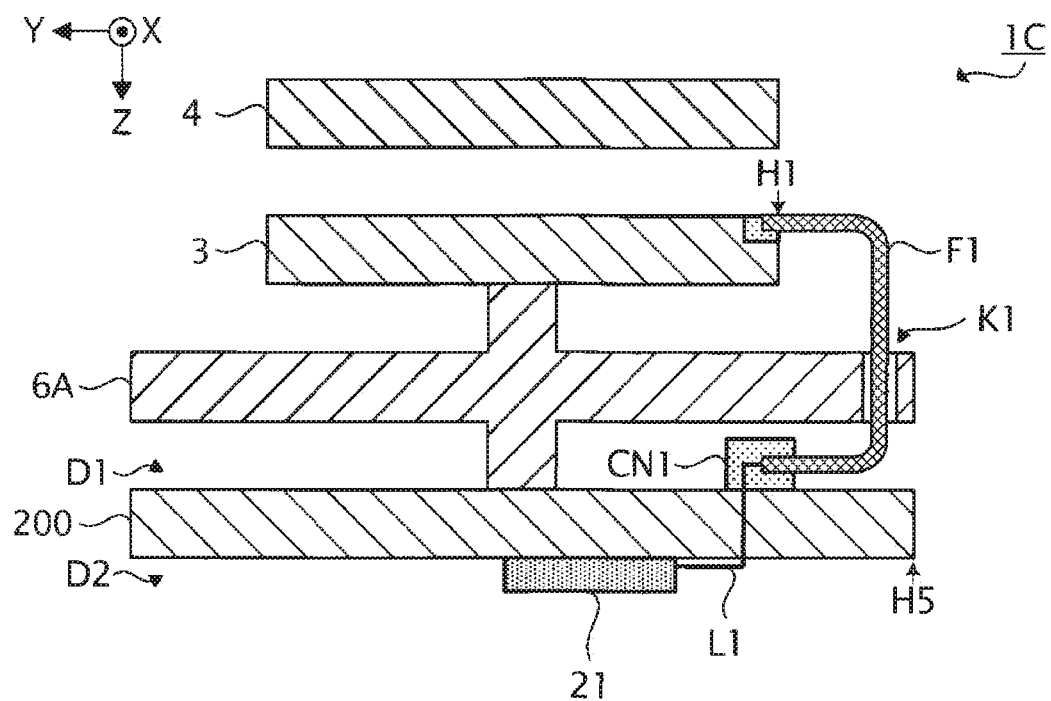
FIG. 14 is a cross-sectional view illustrating an example of a schematic structure of a tablet terminal according to Modification Example 5.

FIG. 14 is a schematic diagram schematically representing the cross-sectional structure of the tablet terminal 1C when the tablet terminal 1C according to the present modification example is viewed from the +X direction. The tablet terminal 1C differs from the tablet terminal 1 according to the embodiment in that a metal frame 6A is provided instead of the metal frame 6 and the connector CN1 is provided on the surface D1 of the control substrate 200 instead of the surface D2. In the tablet terminal 1C, the control substrate 200 is provided with a wiring L1 that couples the connector CN1 provided on the surface D1 and the display control circuit 21 provided on the surface D2. Further, in the tablet terminal 1C, the flexible substrate for a display panel F1 is provided so as to pass through the through hole K1 included in the metal frame 6A, and the flexible substrate for a touch panel F2 passes through more −X side than the metal frame 6A and does not pass through the through hole K1 included in the metal frame 6A.

That is, the tablet terminal 1C according to the present modification example includes the display panel 3 that displays an image, the electrostatic capacitive touch panel 4 that detects the presence/absence of contact, the control substrate 200 provided with a control circuit that controls the display panel 3 and the electrostatic capacitive touch panel 4, the metal frame 6A having the through hole K1 and provided between the display panel 3 and the control substrate 200, the flexible substrate for a display panel F1 that passes through the through hole K1 and couples the display panel 3 and the control substrate 200 to each other, and the flexible substrate for a touch panel F2 provided with the touch panel drive circuit 5 that receives a signal output from the electrostatic capacitive touch panel 4 and couples the electrostatic capacitive touch panel 4 and the control substrate 200 to each other without passing through the through hole K1, in which of the two surfaces included in the control substrate 200, the surface D1 fixed to the metal frame 6A is provided with the connector CN1 to which the flexible substrate for a display panel F1 is coupled, and of the two surfaces of the control substrate 200, the surface D2 that is opposite to the surface D1 is provided with a connector CN2 to which the flexible substrate for a touch panel F2 is coupled.

In this modification example, the flexible substrate for a display panel F1 and the flexible substrate for a touch panel F2 are provided so that the flexible substrate for a display panel F1 passes through the through hole K1 and the flexible substrate for a touch panel F2 does not pass through the through hole K1. Therefore, also in the present modification example, as in the above-described embodiment, the flexible substrate for a display panel F1 and the flexible substrate for a touch panel F2 can be provided so that the flexible substrate for a display panel F1 and the flexible substrate for a touch panel F2 do not overlap each other when viewed from the Z axis direction. That is, according to this modification example, as compared with the comparative example, it is possible to reduce the influence of the magnetic field generated due to the current flowing through the wiring provided on the flexible substrate for a display panel F1 on the signal transmitted by the wiring provided on the flexible substrate for a touch panel F2.

Further, according to the present modification example, since the flexible substrate for a touch panel F2 is provided so as not to pass through the through hole K1, as compared with the case where the flexible substrate for a touch panel F2 passes through the through hole K1, the possibility that the touch panel drive circuit 5 provided on the flexible substrate for a touch panel F2 is damaged can be reduced when the flexible substrate for a touch panel F2 is attached to the tablet terminal 1C.

Modification Example 6

In the above-described embodiment and Modification Examples 1 to 5, a tablet terminal is illustrated as an example of a display device with an electrostatic capacitive touch panel, but the present disclosure is not limited to such an aspect. As the display device with the electrostatic capacitive touch panel, in addition to the tablet terminal, a smartphone, a personal digital assistant, a car navigation device, and any other display device having the electrostatic capacitive touch panel can be adopted.

What is claimed is:
1. A display device with an electrostatic capacitive touch panel comprising:
a display panel displaying an image;
an electrostatic capacitive touch panel detecting a presence/absence of a contact;
a circuit substrate provided with a control circuit that controls the display panel and the electrostatic capacitive touch panel;
a metal frame that has a first opening portion and is provided between the display panel and the circuit substrate;
a first flexible substrate passing through the first opening portion and coupling the display panel and the circuit substrate to each other; and
a second flexible substrate that is provided with a semiconductor element receiving a signal output from the electrostatic capacitive touch panel and an antistatic material preventing electrification in the second flex- ible substrate and the semiconductor element, the second flexible substrate coupling the electrostatic capacitive touch panel and the circuit substrate to each other without passing through the first opening portion, the second flexible substrate having a first end that is connected to the electrostatic capacitive touch panel and a second end that is connected to the circuit substrate, the semiconductor element being disposed on the second flexible substrate between the first end and the second end and spaced apart from the first end and the second end, the antistatic material being disposed on an opposite side of the second flexible substrate from the semiconductor element, the second flexible substrate at least partially extending outside of an outer periphery of the metal frame with respect to a center axis of the display device that extends along a direction perpendicular to the display panel.

2. The display device with the electrostatic capacitive touch panel according to claim 1, wherein
the circuit substrate has a second opening portion,
the first flexible substrate passes through the second opening portion, and
the second flexible substrate does not pass through the second opening portion.

3. The display device with the electrostatic capacitive touch panel according to claim 1, wherein
a first surface of two surfaces included in the circuit substrate is fixed to the metal frame, and
a second surface of the two surfaces included in the circuit substrate, which is on a side opposite to the first surface, is provided with
a first connector to which the first flexible substrate is coupled, and
a second connector to which the second flexible substrate is coupled.

4. The display device with the electrostatic capacitive touch panel according to claim 3, wherein
the first flexible substrate is coupled to the first connector from a first direction, and
the second flexible substrate is coupled to the second connector from a second direction substantially orthogonal to the first direction.

5. The display device with the electrostatic capacitive touch panel according to claim 4, wherein
the circuit substrate has
a first side that extends in the first direction and intersects with the second flexible substrate when viewed from a direction perpendicular to the first direction and the second direction, and
a second side that extends in the second direction, and the second side is longer than the first side.

6. The display device with the electrostatic capacitive touch panel according to claim 1, wherein
a first surface of two surfaces included in the circuit substrate, which is fixed to the metal frame, is provided with a first connector to which the first flexible substrate is coupled, and a second surface of the two surfaces included in the circuit substrate, which is on a side opposite to the first surface, is provided with a second connector to which the second flexible substrate is coupled.

7. The display device with the electrostatic capacitive touch panel according to claim 1, wherein
when viewed from a direction perpendicular to the display panel, the first flexible substrate and the second flexible substrate do not overlap each other.

8. The display device with the electrostatic capacitive touch panel according to claim 1, wherein
the display panel is provided between the electrostatic capacitive touch panel and the circuit substrate.

9. The display device with the electrostatic capacitive touch panel according to claim 1, wherein
the semiconductor element is provided on one surface of two surfaces included in the second flexible substrate,
the antistatic material is provided on the other surface of the two surfaces included the second flexible substrate, and
the other surface is a surface on the circuit substrate side of the two surfaces included in the second flexible substrate.

10. The display device with the electrostatic capacitive touch panel according to claim 1, wherein
the display panel is fixed to the metal frame.

11. The display device with the electrostatic capacitive touch panel according to claim 1, wherein
the circuit substrate is provided with a power supply circuit supplying a first drive voltage that drives the display panel to the display panel and supplying a second drive voltage that drives the electrostatic capacitive touch panel to the electrostatic capacitive touch panel, and
the first drive voltage is higher than the second drive voltage.

12. The display device with the electrostatic capacitive touch panel according to claim 1, wherein
the display panel has
200 or more pixels arranged in a first direction, and
300 or more pixels arranged in a second direction intersecting the first direction.

13. The display device with the electrostatic capacitive touch panel according to claim 1, wherein
the display panel has a size of 4 inches or more.

14. The display device with the electrostatic capacitive touch panel according to claim 1, wherein
the electrostatic capacitive touch panel has 200 or more touch sensors.

15. The display device with the electrostatic capacitive touch panel according to claim 1, wherein
the electrostatic capacitive touch panel has a touch sensor that is configured to detect a presence/absence of a touch on the touch sensor 90 times or more per second.

* * * * *